United States Patent

[11] 3,551,712

| [72] | Inventors | Malcolm D. Jones<br>Belleville, Mich.;<br>Hugh E. Riordan, Wyckoff, N.J. |
|---|---|---|
| [21] | Appl. No. | 747,507 |
| [22] | Filed | July 25, 1968 |
| [45] | Patented | Dec. 29, 1970 |
| [73] | Assignee | Kelsey-Hayes Company<br>Romulus, Mich.<br>a corporation of Delaware |

[54] SENSOR WITH FLEXIBLE COUPLING
11 Claims, 4 Drawing Figs.

[52] U.S. Cl. .................................................. 310/67,
310/75, 310/168, 310/266, 310/267
[51] Int. Cl. ........................................................ H02k 11/00
[50] Field of Search .......................................... 310/268,
261—269, 154—156, 48, 51, 66, 67, 67.1, 74, 75,
103, 106, 109, 209, 164, 168, 181

[56] References Cited
UNITED STATES PATENTS

| 2,658,157 | 11/1953 | Brouwer | 310/156 |
|---|---|---|---|
| 3,152,275 | 10/1964 | Aske | 310/154X |
| 2,698,396 | 12/1954 | Stokmans | 310/156 |
| 2,499,036 | 2/1950 | Planet | 310/103X |
| 3,179,831 | 4/1965 | Moressee et al. | 310/268 |
| 3,197,659 | 7/1965 | Marshall | 310/74X |
| 3,323,793 | 6/1967 | Brown | 310/156X |
| 2,638,557 | 5/1953 | Longert | 310/156X |
| 3,107,946 | 10/1963 | Drake | 310/51UX |
| 3,361,914 | 1/1968 | Janssen | 310/66X |
| 2,715,685 | 8/1955 | Brown | 310/268X |

FOREIGN PATENTS

| 90,495 | 10/1937 | Sweden | 310/67.1 |
|---|---|---|---|
| 860,687 | 2/1961 | Great Britain | 310/267 |

*Primary Examiner*—Milton O. Hirshfield
*Assistant Examiner*—B. A. Reynolds
*Attorney*—Harness, Dickey and Pierce ABSTRACT: An electrical sensor for sensing rotational speed between a pair of relatively rotatable members with sensor including a pair of relatively rotatable poles being mounted, such that there will be substantially no change in air gap despite relative radial and axial movement between the relatively rotatable members.

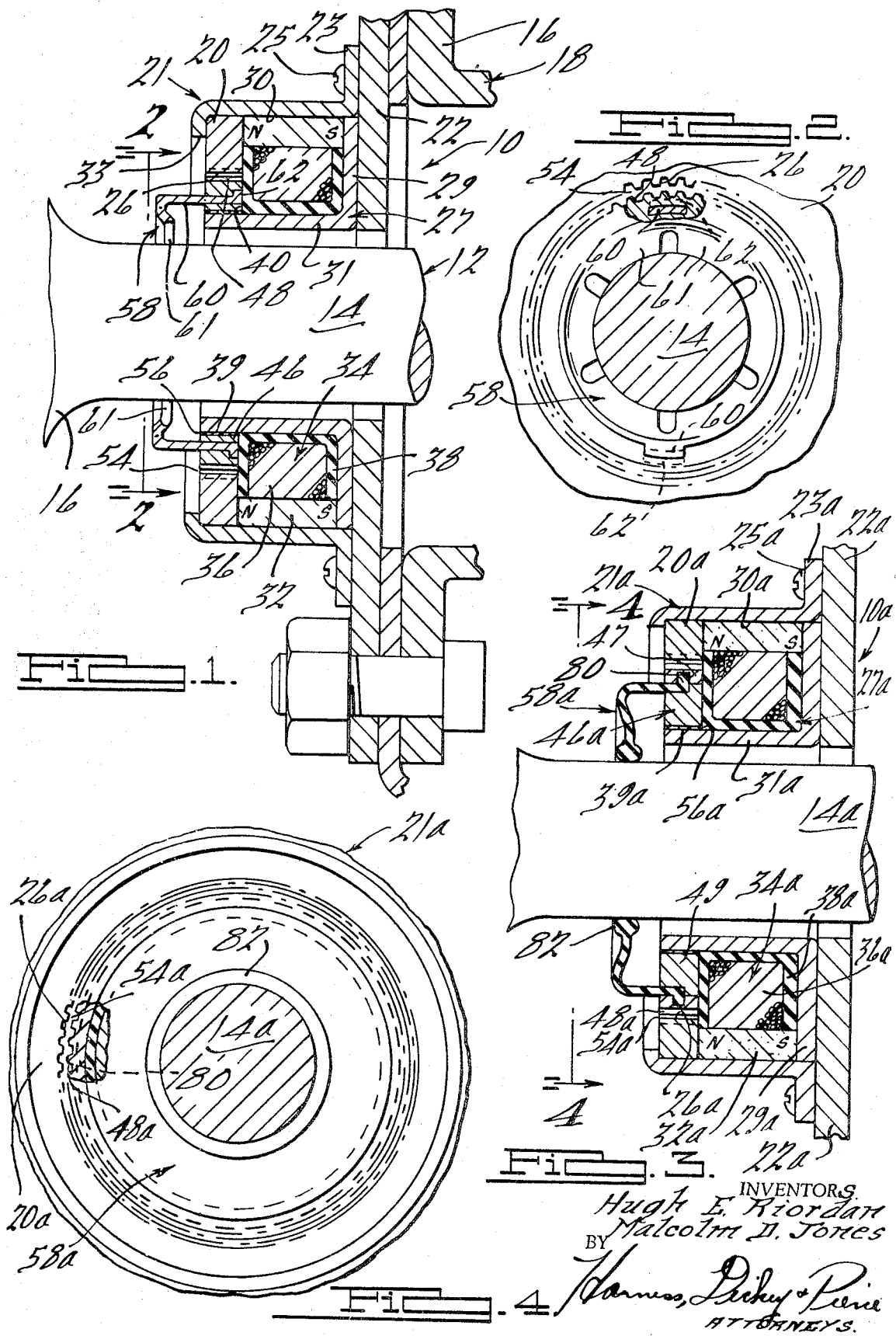

SENSOR WITH FLEXIBLE COUPLING

SUMMARY BACKGROUND OF THE INVENTION

The present invention relates to electrical speed sensors.

In sensing the rotational speed at the rear wheels of a vehicle, a desirable location for the sensor is between the axle shaft flange and axle housing of the rear wheel. However, it has been found that under severe load conditions the rear axle shaft undergoes substantial radial deflection relative to the housing; the axle shaft can also move axially relative to the housing. With a sensor construction having a pair of relatively rotatable pole members, one being fixed to the axle housing and the other being fixed to rotate with the axle shaft, it has been found that the extreme radial and/or axial deflections under severe load of the axle shaft cause substantial variation in the air gap between the sensor pole members and in some cases could cause the two members to engage resulting in damage to the sensor. The problem of engagement can be avoided by providing a sufficiently large air gap or spacing between the two sensor pole members such that even under the most extreme load conditions of the axle shaft such engagement would not occur. However, with such a construction a relatively wide air gap would be required reducing the efficiency of the sensor. In the present invention the air gap is maintained at a minimum and the sensor pole member secured to the axle shaft is mounted by a resilient construction such that the pole member will not be moved axially or radially despite relative movement of the axle shaft hence permitting the provision of a desired minimum air gap. Hence a highly efficient construction can be provided.

Therefore, it is an object of the present invention to provide an improved sensor construction for sensing relative rotation between two relatively rotating members.

It is another object of the present invention to provide a new and improved sensor construction of the above described type in which the sensing rings or poles are secured such that a substantially constant air gap is maintained despite extreme load conditions causing relative radial and/or axial motion between the members whose relative rotational speed is being sensed.

It is another object of the present invention to provide a novel and improved sensor construction for use with the rear axle assembly of a vehicle in which the sensing rings or poles of the sensor are mounted to the axle shaft and axle housing in a manner providing substantially no radial and/or axial relative movement whereby a minimum air gap can be maintained.

Other objects, features, and advantages of the present invention will become apparent from the subsequent description and the appended claims, taken in conjunction with the accompanying drawings, in which:

FIG. 1 is an elevational view with some parts shown in section and others broken away of a sensor assembly embodying features of the present invention;

FIG. 2 is a sectional view to reduce scale of the sensor assembly of FIG. 1 taken generally along the lines 2-2;

FIG. 3 is a view similar to FIG. 1 of a modified form of sensor assembly; and

FIG. 4 is a sectional view of the sensor assembly of FIG. 3 taken generally along the lines 4-4.

Looking now to the FIGS. 1 and 2 of the drawing, the sensor assembly is generally indicated by the numeral 10 and is shown in assembly relationship with a rear axle assembly 12 which rear axle assembly includes an axle shaft 14 which terminates at its outer end in a flange 16 to which a wheel assembly (not shown) can be mounted. The axle shaft 14 is rotatably mounted within an axle housing assembly 18 to which at least a portion of the sensor assembly 10 is mounted.

The sensor has an annularly extending stator or fixed pole member 20 which is mounted at the outer end of a housing assembly 19 which includes a frame 21, of nonmagnetic material. The frame 21 is generally cup-shape and has an enlarged flange 23 by which the frame 21 is secured to a mounting plate 22 by fasteners 25. The housing assembly 21 is secured to the flange 16 of the axle housing 18 via the plate 22. The ring-shaped stator 20 terminates in a plurality of generally uniformly circumferentially disposed, axially extending teeth 26. The housing assembly 21 has an L-sectioned annular support member 27 which includes an axial portion 31 and a radial flange 29 which engages plate 22. The frame 21 and support member 27 together define an annular cavity 30 in which are located the stator 20, a permanent magnet 32 and a coil assembly 34. The permanent magnet 32 is preferably of an annular ring construction having a polarity as indicated in FIG. 1. The coil assembly 34 also extends annularly within the opening 30 and includes an electrical coil 36 which is wound in a plastic bobbin 38. The bobbin 38 can be constructed of a material having good bearing characteristics such as Teflon for a purpose to be described. The frame 21 has an opening 33 at its outer end through which extends an assembly including a rotor 46. The rotor or pole member 46 is ring-shaped and has a plurality of axially extending, uniformly circumferentially disposed teeth 48. With the assembly as shown and described thus far a first air gap 54 is defined between the teeth 26 and 48 and a second air gap 56 is defined between the rotor 46 and the support member 27. A bearing member 39 is located in air gap 56 and supports rotor 46 for rotation. The rotor 46 also engages the forward face 40 of bobbin 38 which face 40 has good bearing characteristics. The rotor 46 is rotated by a drive ring 58 which is secured to the axle shaft 14 and hence will rotate therewith.

The drive ring 58 has a plurality of axially extending fingers 60 at its outer periphery, which engage, through bent portions 62, the rotor 46. The drive member 58 has a plurality of radially inwardly extending fingers 61 which grip the axle shaft 14 such that rotation of shaft 14 will result in rotation of ring 58. Note that relative radial movement of shaft 14 will be accommodated by flexing of fingers 60 while axial movement will be accommodated by fingers 61. Thus, rotation of the shaft 14 will cause rotation of rotor 46 via the drive ring 58 resulting in an induced potential in coil 36 of a frequency indicative of the rotational speed of axle shaft 14. Note that since the material of the bobbin 38 has good bearing characteristics the bearing surface 40 will provide only slight frictional resistance to rotor 46.

In the event of radial deflection of the axle shaft 14 relative to the axle housing 18, the relative position between the armature 46 and the stator 20 will be unchanged since the fingers 60 will be free to flex radially without disturbing the position of the rotor 46. Note that fingers 60 are generally L-shaped and hence along with fingers 61 can flex in response to relative axial movement between axle shaft 14 and housing 18. With this type of connection between the drive member 58 and rotor 46 relative axial movement between the axle shaft 14 and the axle housing 18 can occur generally without damage to the rotor 46 and/or the stator 20. Thus, with the construction shown, relative axial and radial movement between the axle shaft 14 and the axle housing 18 can occur with little or no change in the air gaps 54 and 56; since these air gaps will be maintained at a constant width, they can be provided to be of a minimum whereby the reluctance will be a minimum resulting in an efficient sensor. A modified form is shown in FIGS. 3 and 4 in which parts similar to corresponding parts in the embodiment of FIGS. 1 and 2 are given the same numeral designations with the addition of the letter a. In FIGS. 3 and 4 the rotor 46a is made of two pieces 47 and 49 which define a split ring with a drive ring 58a being a cup or boot made of an elastomeric material and having an axially inner, radially outer bead 80 located in confronting grooves in pieces 47 and 49 and having an axially outer, radially inner bead 82 compressively gripping shaft 14a. Thus rotation of the rotor assembly 46a will be via the elastic member 58a. Note again both axial and radial movement of the axle shaft 14a relative to housing 18a can be accommodated without change in the air gaps 54a and 56a. Thus these air gaps can be maintained at a minimum resulting in an efficient sensor. With elastic member 58a the magnetic forces on rotor 46a will tend to keep it axially centered in gaps 54a and 56a via solenoid action.

In both constructions note that the air gaps 54 and 56 and 54a and 56a are coaxial and radially coplanar. With this construction there is negligible radial force on the rotor 46 (46a) and hence the bearing need support only the rotor 46 (46a); since the loads are minimized lubrication problems are minimized. By having the gaps radially coplanar twisting, which might occur if the gaps were separated axially, is avoided.

While it will be apparent that the preferred embodiments of the invention disclosed are well calculated to fulfill the objects above stated, it will be appreciated that the invention is susceptible to modification, variation and change.

We claim:

1. An electrical rotational speed sensor for providing an electrical signal indicative of the rotational speed between a pair of members with one of the members supported for rotation relative to the other, the sensor comprising: a rotor connected to the one of the members for rotation therewith, a stator connected to the other of the members proximate to said rotor, a magnetic path having a preselected axially extending air gap between confronting surfaces on said rotor and said stator, resilient drive coupling means connecting said rotor and the one of the members for resiliently permitting relative movement between said rotor and said one member in both axial and radial directions, and bearing means radially coplanar with said air gap radially supporting said rotor with respect to said stator so as to prevent relative radial motion therebetween thereby maintaining said air gap substantially constant upon relative motion between said members in said directions through deflection of said resilient coupling means.

2. The sensor of claim 1 with said resilient coupling means including a finger connected to said rotor for resilient movement in one of axial and radial directions and for rotating said rotor and including a plurality of fingers engageable with the one of the members for resilient movement in the other of axial and radial directions.

3. The sensor of claim 2 wherein the plurality of fingers resiliently grip the one member.

4. The sensor of claim 2 wherein the bearing means is located in said air gap in the magnetic path for the sensor.

5. The sensor of claim 1 with said resilient coupling means including an elastomeric member connected to said rotor for resilient movement in said both directions and for driving said rotor.

6. The sensor of claim 5 with said elastomeric member being generally cup-shaped and open at both ends with one end resiliently gripping the one of the members and the other end resiliently engaging said rotor.

7. The sensor of claim 1 with said bearing means being located in said air gap in the magnetic path for the sensor.

8. An electrical rotational speed sensor for providing an electrical signal indicative of the relative rotational speed between a pair of relatively rotatable members, said speed sensor comprising a rotor, means for resiliently coupling said rotor to one of said members for relative rotation therewith and for permitting axial and radial movement between said rotor and said one member, said resilient coupling means comprising a plurality of axially resilient, generally radially extending fingers affixed at one of their ends to said one member and a plurality of generally axially extending, radially resilient fingers connected at one of their ends to said generally radially extending fingers and at their other ends to said rotor, a stator operatively connected to the other of said members and proximate to said rotor, said rotor and said stator defining at least in part a magnetic path having a preselected axially extending air gap between confronting surfaces of said rotor and said stator, and bearing means radially coplanar with said air gap radially supporting said rotor with respect to said stator so as to prevent relative radial motion therebetween thereby maintaining said air gap substantially constant regardless of relative axial and radial movement between said members through deflection of said resilient coupling means.

9. A electrical rotational speed sensor as set forth in claim 8 further including bearing means fixed relative to the other of the members and operatively associated with said rotor for axially and radially locating said rotor through deflection of the resilient coupling means.

10. An electrical rotational speed sensor for providing an electrical signal indicative of the relative rotational speed between a pair of relatively rotatable members, said speed sensor comprising a rotor, means for resiliently coupling said rotor to one of said members for relative rotation therewith and for permitting axial and radial movement between said rotor and said one member, said resilient coupling means comprising an elastomeric member having a first generally radially extending, axially resilient portion affixed at one of its ends against relative rotation to the one member and a second generally axially extending, radially resilient portion affixed at one of its ends to the other end of said generally radially extending portion and at its other end to said rotor, a stator operatively connected to the other of said members and proximate to said rotor, said rotor and said stator defining at least in part a magnetic path having a preselected axially extending air gap between confronting surfaces of said rotor and said stator, and bearing means radially coplanar with said air gap radially supporting said rotor with respect to said stator so as to prevent relative radial motion therebetween thereby maintaining said air gap substantially constant regardless of relative axial and radial movement between said members through deflection of said coupling means.

11. An electrical rotational speed sensor as set forth in claim 10 further including bearing means fixed relative to the other of the members and operatively associated with said rotor for axially and radially locating said rotor through deflection of the resilient coupling means.